US012737192B2

(12) United States Patent
Chen et al.

(10) Patent No.: US 12,737,192 B2
(45) Date of Patent: Sep. 15, 2026

(54) FAST METHOD FOR CREATING MULTI-NODE CLUSTERS

(71) Applicant: Dell Products L.P., Round Rock, TX (US)

(72) Inventors: Jun Chen, Shanghai (CN); Yun Sun, Shanghai (CN); Yufang Chen, Shanghai (CN); Hongbo Geng, Shanghai (CN); DongYe Yang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 18/934,596

(22) Filed: Nov. 1, 2024

(65) Prior Publication Data

US 2026/0104898 A1 Apr. 16, 2026

(30) Foreign Application Priority Data

Oct. 15, 2024 (CN) ........................ 202411440382.X

(51) Int. Cl.

| | |
|---|---|
| ***G06F 15/177*** | (2006.01) |
| ***G06F 9/00*** | (2018.01) |
| ***G06F 9/4401*** | (2018.01) |

(52) U.S. Cl.

CPC ............ *G06F 9/441* (2013.01); *G06F 9/4411* (2013.01)

(58) Field of Classification Search

CPC ............................... G06F 9/441; G06F 9/4411

See application file for complete search history.

(56) References Cited

U.S. PATENT DOCUMENTS

| | | | | |
|---|---|---|---|---|
| 7,363,480 | B1 * | 4/2008 | Righi | G06F 8/65 709/219 |
| 2010/0174810 | A1 * | 7/2010 | Cain | G06F 9/4416 709/222 |
| 2014/0053149 | A1 * | 2/2014 | Wu | G06F 8/63 717/176 |
| 2016/0182349 | A1 * | 6/2016 | Kikuchi | H04L 12/185 370/389 |
| 2021/0136147 | A1 * | 5/2021 | Giassa | H04L 67/1031 |
| 2021/0326150 | A1 * | 10/2021 | Raayman | H04L 61/5014 |

* cited by examiner

*Primary Examiner* — Xuxing Chen

(74) *Attorney, Agent, or Firm* — Jackson Walker L.L.P.

(57) ABSTRACT

Disclosed systems and methods may include booting a first node of a multi-node cluster from an attached storage medium, e.g., a USB drive, into a bootstrap OS. The bootstrap OS may initiate PXE and file share services on the first node. Disclosed features may copy one or more software bundles for a target OS from the attached storage medium to persistent storage in the first node. The method may further include PXE booting one or more other nodes of the multi-node cluster into the bootstrap OS and connecting one or more of the other nodes to the first node via a high speed switch. One or more software bundles, including software for a targeted OS, may be copied from the persistent store to at least one of the one or more other nodes via the high speed switch.

14 Claims, 2 Drawing Sheets

FAST METHOD FOR CREATING MULTI-NODE CLUSTERS

TECHNICAL FIELD

The present disclosure is in the field of enterprise scale system management and, more specifically, operating system (OS) deployment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In general, a server-class information handling system can boot an OS from various sources including a local storage medium such as a compact disc (CD), a hard disk drive (HDD), or a solid state drive (SSD), a locally-attached external medium, e.g., a Universal Serial Bus (USB) drive, or a remote, network-attached medium such as a pre-boot execution environment (PXE) boot store.

A server may load and execute two or more OS types of different sizes and capabilities. OS types referred to within the present disclosure include, a bootable OS, a bootstrap OS, and a target OS. A bootable OS may be loaded directly into and executed from the server's system memory in response to a cold and/or hard reset. The bootstrap OS may refer to an intermediate-footprint OS suitable for providing services to facilitate installation of a targeted runtime OS, such as a Windows family OS from Microsoft or a Linux-based OS distribution.

In at least some deployments, the resources of multiple servers, each of which may be referred to as a node, may be configured as a multi-node cluster. Such clusters may be deployed in hyperconverged infrastructure (HCI) appliances featuring tightly integrated and centrally managed compute, storage, and network resources. The VxRail family of HCI appliances from Dell Technologies is an example of an HCI appliance.

The number of nodes included in a single cluster may vary from two to as many as 64 or more. During cluster creation, it may be necessary to reimage each node with images for one or more OS types.

During a server reimage, the server may boot into the bootable OS, copy bootstrap OS and target OS, install bootstrap OS, and boot into bootstrap OS. All of these operations are performed within bootable OS. The target OS is very large. An Openshift NIM package size, as an example, exceeds 30 G and an MSAZ NIM package size >25 G. Mounting such a large remote shared file may be unacceptably time consuming, particularly when the data is transferred via a management port switch that frequently has a lower data transfer capacity. As a result it may take a long time, e.g., more than 1 hour to download target HCI OS with BMC limited network(1 Gb/s). Use of a USB image file improves the data transfer performance, but must be performed on each node.

SUMMARY

Disclosed features perform fast creation of multi node clusters, by minimizing or otherwise reducing the operations performed within a bootable OS by limiting the bootable OS to copying the bootstrap OS to the system and then installing it. When the node boots into bootstrap OS, the node can copy the target OS and provide a shared folder on data port network(25 G) to provide bootstrap OS and target OS sharing for copying by another reimage node.

Common problems associated with creating multimode clusters are addressed by disclosed methods and systems for creating multi-node clusters that may reimage each node in the cluster. However, rather than reimaging each node with a USB boot and transferring an image for the target OS and other software over a comparatively slow network switch, disclosed features may re-image in the conventional manner, e.g., via USB boot, to boot a bootstrap OS that can initiate PXE services and support file sharing to transfer a target OS image to each of the other nodes in the cluster via a high speed data switch.

In at least one aspect, disclosed systems and methods may boot a first node of the multi-node cluster from an attached storage medium, e.g., a USB drive, into a bootstrap OS. The bootstrap OS may initiate PXE and file share services on the first node. Disclosed features may copy one or more software bundles for a target OS from the attached storage medium to persistent store in the first node. The method may further include PXE booting one or more other nodes of the multi-node cluster into the bootstrap OS and connecting one or more of the other nodes to the first node via a high speed switch. One or more software bundles, including software for a targeted OS, may be copied from the persistent store to at least one of the one or more other nodes via the high speed switch.

Booting the first node may include a triggering operation such as inserting a USB drive into a USB port of the information handling system. Each node may include a data port connected to the high speed switch and each node includes a management port connected to a management network switch.

In at least some embodiments, PXE booting the one or more other nodes may be triggered by powering on each of the one or more other nodes at the same time or substantially the same time. In some embodiments, booting into the bootstrap OS includes loading an initial OS, e.g., the bootable OS, into system memory in response to a power on and running the initial OS to load and install the bootstrap OS.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
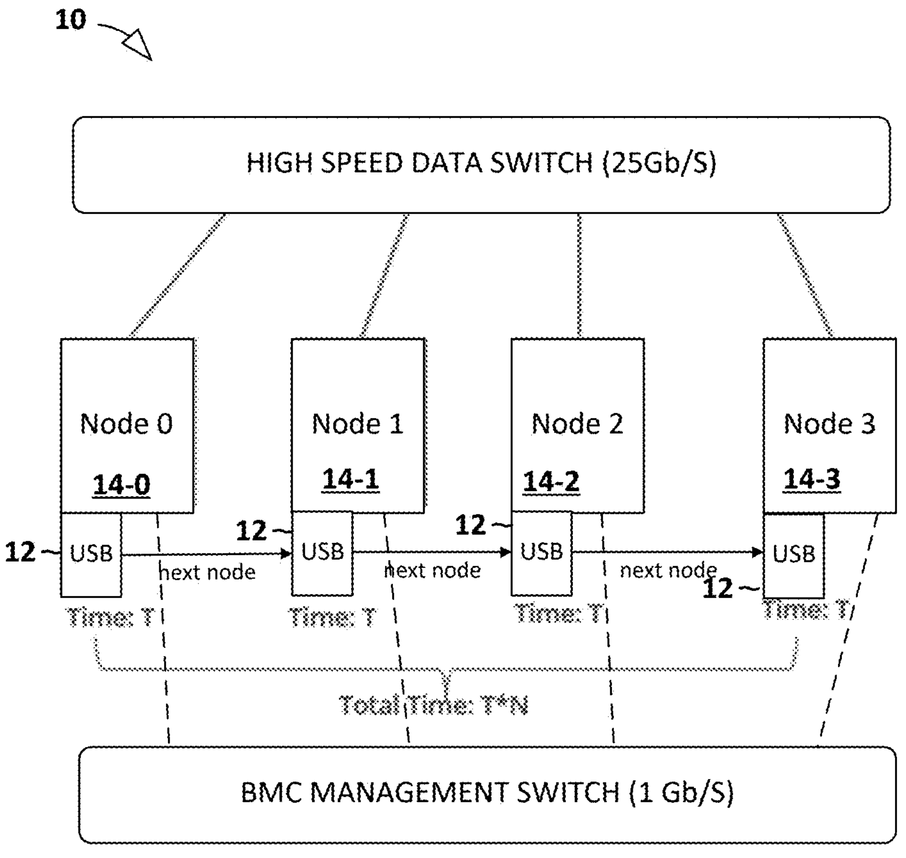
FIG. 1 depicts a conventional process for creating a multi-node cluster in accordance with prior art.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 depicts a conventional creation of multi-node cluster 10 in which a USB drive 12 containing an installable image file, referred to herein as an all-in-one image file because it may include a bootable OS, a bootstrap OS, and software bundles for one or more target OS, is used to reimage each of the four nodes 14-0 through 14-3 shown in FIG. 1. After the USB drive 12 has successfully booted one of the nodes 14, the USB drive 12 may be physically transported to and plugged into a USB port on the next node 14 to repeat the reimage process. While data transfer rates of a USB drive may be acceptable, the conventional process is inefficient for repeating potentially time consuming re-imaging operations in serial fashion.

Figure 2:
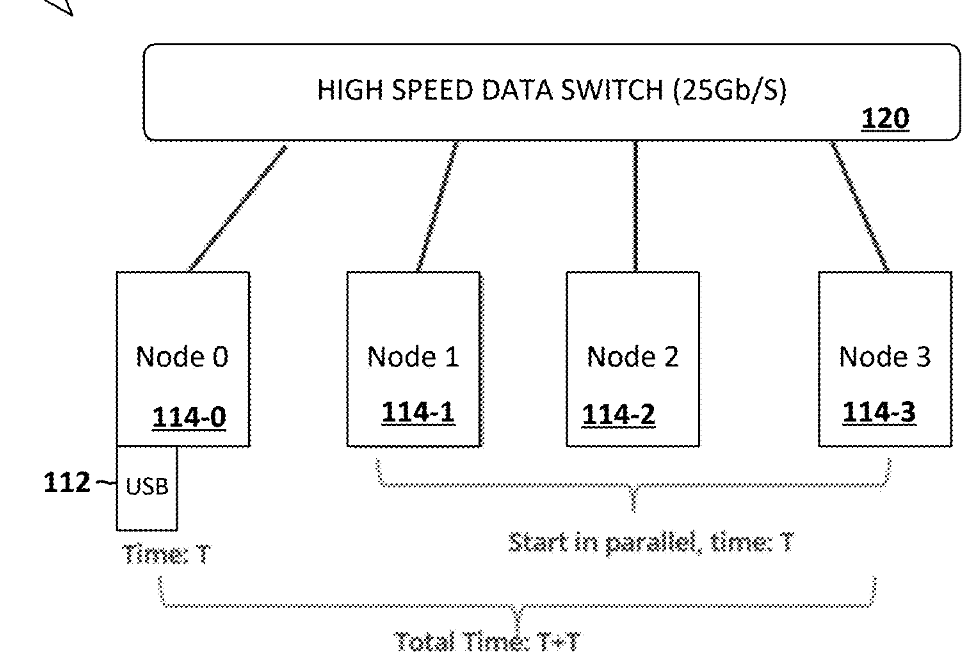
FIG. 2 depicts creation of a multimode cluster.

Turning now to FIG. 2, a feature for creating a multimode cluster 100 in accordance with disclosed subject matter is depicted. The multimode cluster 100 of FIG. 2 may be created by efficiently reimaging each of the nodes 114. The first node 114-0 may be re-imaged using USB drive 112 in substantially the same manner as the multi-node cluster 10 in FIG. 1. The reimaging process may boot the first node 114-0 into the bootstrap OS. The bootstrap OS may enable PXE services and file sharing that enable the remaining nodes 114-1 through 114-3 to leverage the high speed data switch 120 to which each node 114 is connected to noticeably decrease the data transfer time required to copy the OS image files from the first node 114-0. Comparing FIG. 1 and FIG. 2, it can be seen that the remaining process depicted in FIG. 1 requires an interval of time roughly equal to N*T wherein N is the number of nodes and T is the time required to transfer the required data via the USB drive. In contrast, FIG. 2 indicates that the file transfer interval is roughly equal to 2*T and largely independent of the number of nodes. More specifically, as depicted in FIG. 2, reimaging the first node 114-0 requires the same or substantially the same amount of time required to reimage the first node 114-0 in FIG. 1, but all of the remaining nodes 114-1 through 114-3 are reimaged substantially in parallel via a high speed data switch to reduce the amount of time required.

Figures 3, 4:
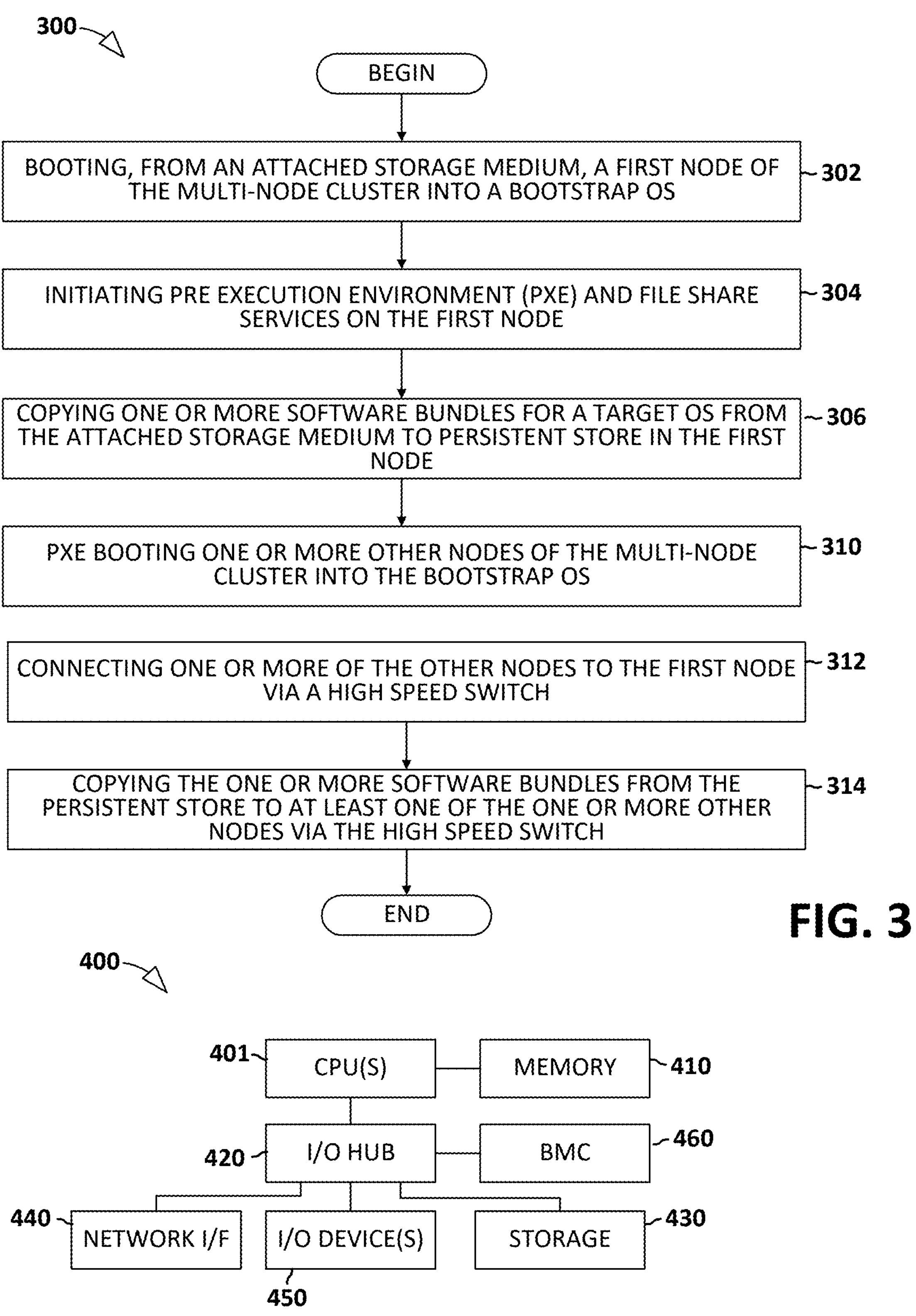
FIG. 3 illustrates a flow diagram of a cluster creating method.
FIG. 4 illustrates a representative information handling system suitable for use in conjunction with subject matter illustrated in FIGS. 1-3 and described in the accompanying description.

Referring now to FIG. 3, a flow diagram illustrates an exemplary method 300 for efficient reimaging of multiple nodes to create a multimode cluster. The illustrated method 300 begins by booting (operation 302), from an attached storage medium, a first node of the multi-node cluster into a bootstrap OS. The bootstrap OS may initiate (operation 304) PXE and file share services on the first node. One or more software bundles for a target OS may then be copied (operation 306) from the attached storage medium to persistent store in the first node. The illustrated method 300 further includes PXE booting (operation 310) the other nodes of the multi-node cluster into the bootstrap OS and connecting (operation 312) one or more of the other nodes to the first node via a high speed switch. The illustrated method 300 then copies (operation 314) the one or more software bundles from the persistent store to at least one of the one or more other nodes via the high speed switch.

Referring now to FIG. 4, any one or more of the elements illustrated in FIG. 1 through FIG. 2 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A multi-node cluster creation method, comprising:

booting, from an attached storage medium, a first node of the multi-node cluster into a bootstrap operating system (OS);

initiating pre execution environment (PXE) and file share services on the first node;

copying one or more software bundles for a target OS from the attached storage medium to persistent storage in the first node;

PXE booting one or more other nodes of the multi-node cluster into the bootstrap OS;

connecting one or more of the other nodes to the first node via a high speed switch; and copying the one or more software bundles from the persistent storage to at least one of the one or more other nodes via the high speed switch.

2. The method of claim 1, wherein booting the first node comprises inserting a Universal Serial Bus (USB) drive into a USB port of an information handling system.

3. The method of claim 1, wherein each node includes a data port connected to the high speed switch.

4. The method of claim 3, wherein each node includes a management port connected to a management network switch.

5. The method of claim 1, wherein PXE booting the one or more other nodes comprises powering on each of the one or more other nodes.

6. The method of claim 5, wherein powering on each of the one or more other nodes comprises powering on each of the one or more other nodes at substantially the same time.

7. The method of claim 1, wherein booting into the bootstrap OS includes loading an initial OS into system memory in response to a power on and running the initial OS to load and install the bootstrap OS.

8. An information handling system, comprising:

a central processing unit (CPU); and a system memory including processor executable instructions that, when executed by the CPU, cause the system to perform multi-node cluster creation operations including:

booting, from an attached storage medium, a first node of the multi-node cluster into a bootstrap operating system (OS);

initiating pre execution environment (PXE) and file share services on the first node; and copying one or more software bundles for a target OS from the attached storage medium to persistent storage in the first node;

PXE booting one or more other nodes of the multi-node cluster into the bootstrap OS;

connecting one or more of the other nodes to the first node via a high speed switch;

copying the one or more software bundles from the persistent storage to at least one of the one or more other nodes via the high speed switch.

9. The information handling system of claim 8, wherein booting the first node comprises inserting a Universal Serial Bus (USB) drive into a USB port of the information handling system.

10. The information handling system of claim 8, wherein each node includes a data port connected to the high speed switch.

11. The information handling system of claim 10, wherein each node includes a management port connected to a management network switch.

12. The information handling system of claim 8, wherein PXE booting the one or more other nodes comprises powering on each of the one or more other nodes.

13. The information handling system of claim 12, wherein powering on each of the one or more other nodes comprises powering on each of the one or more other nodes at substantially the same time.

14. The information handling system of claim 8, wherein booting into the bootstrap OS includes loading an initial OS into system memory in response to a power on and running the initial OS to load and install the bootstrap OS.

* * * * *